United States Patent
Kehrer et al.

(10) Patent No.: US 11,340,605 B2
(45) Date of Patent: May 24, 2022

(54) METHOD FOR THE COMPUTER-AIDED PROCESSING OF OPERATING DATA RELATING TO A TECHNICAL SYSTEM

(71) Applicant: Siemens Aktiengesellschaft, Munich (DE)

(72) Inventors: Johannes Kehrer, Munich (DE); Sebastian Krueger, Erlangen/Eltersdorf (DE); Christoph Paulitsch, Karlsruhe (DE); Mahmut Halil Süer, Fürth (DE); Thomas Vogel, Östringen (DE); Jens Winter, Hessisch Lichtenau (DE); Stefan Hagen Weber, Munich (DE)

(73) Assignee: SIEMENS AKTIENGESELLSCHAFT

( * ) Notice: Subject to any disclaimer, the term of this patent is extended or adjusted under 35 U.S.C. 154(b) by 18 days.

(21) Appl. No.: 16/771,751

(22) PCT Filed: Nov. 22, 2018

(86) PCT No.: PCT/EP2018/082218
§ 371 (c)(1),
(2) Date: Jun. 11, 2020

(87) PCT Pub. No.: WO2019/129445
PCT Pub. Date: Jul. 4, 2019

(65) Prior Publication Data
US 2021/0141371 A1    May 13, 2021

(30) Foreign Application Priority Data
Dec. 27, 2017   (EP) ..................... 17210676

(51) Int. Cl.
*G05B 23/02*   (2006.01)
(52) U.S. Cl.
CPC ............................ *G05B 23/0272* (2013.01)

(58) Field of Classification Search
None
See application file for complete search history.

(56) References Cited

U.S. PATENT DOCUMENTS

| | | |
|---|---|---|
| 2005/0091576 A1 | 4/2005 | Relyea et al. |
| 2012/0327450 A1 | 12/2012 | Sagan et al. |

(Continued)

FOREIGN PATENT DOCUMENTS

| | | |
|---|---|---|
| DE | 10051086 A1 | 4/2002 |
| EP | 1895416 A1 | 3/2008 |

(Continued)

OTHER PUBLICATIONS

PCT International Search Report dated Mar. 15, 2019 corresponding to PCT International Application No. PCT/EP2018/082218 filed Nov. 22, 2018.

(Continued)

*Primary Examiner* — Carlos R Ortiz Rodriguez
(74) *Attorney, Agent, or Firm* — Schmeiser, Olsen & Watts LLP

(57) ABSTRACT

A method for the computer-aided processing of operating data relating to a technical system, wherein the operating data have been captured during operation of the technical system in a predefined operating interval and are stored as digital data in a memory is provided. A pair of first state variables and one or more second state variables with corresponding state values of the technical system at the particular operating time are extracted from the operating data by the method. A two-dimensional representation is generated on a display of a user interface by these state variables. Bar charts for different state ranges of the pairs of first state variables are generated in this representation on the basis of the evaluation of a threshold value criterion, wherein the bar charts represent, inter alia, how many states (Continued)

of the technical system within the particular state range can be classified as critical.

24 Claims, 4 Drawing Sheets

(56) References Cited

U.S. PATENT DOCUMENTS

| | | |
|---|---|---|
| 2013/0253866 A1 | 9/2013 | Chioua et al. |
| 2015/0035834 A1 | 2/2015 | Axness et al. |
| 2015/0235397 A1 | 8/2015 | Beckman |
| 2016/0103475 A1 | 4/2016 | Lee et al. |

FOREIGN PATENT DOCUMENTS

| | | |
|---|---|---|
| EP | 2453330 A1 | 5/2012 |
| EP | 2631727 A2 | 8/2013 |
| EP | 2833228 A2 | 2/2015 |
| EP | 3007019 A1 | 4/2016 |
| RU | 2371758 C2 | 10/2009 |
| RU | 2606056 C2 | 1/2017 |

OTHER PUBLICATIONS

Australian Office Action dated Dec. 24, 2020 for Application No. 2018395811.
Drebenstedt, Carsten et al: "Mine Planning and Equipment Selection"; Proceedings of the 22nd MPES Conference, Dresden, Germany; Jan. 1, 2014, pp. 1-27, DOI: 10.1007/978-3-319-02678-7.

METHOD FOR THE COMPUTER-AIDED PROCESSING OF OPERATING DATA RELATING TO A TECHNICAL SYSTEM

CROSS-REFERENCE TO RELATED APPLICATIONS

This application claims priority to PCT Application No. PCT/EP2018/082218, having a filing date of Nov. 22, 2018, which is based on EP Application No. 17210676.7, having a filing date of Dec. 27, 2017, the entire contents both of which are hereby incorporated by reference.

FIELD OF TECHNOLOGY

The following relates to a method and to a device for the computer-aided processing of operating data of a technical system. The following furthermore relates to a computer program product and to a computer program.

BACKGROUND

An operating point or an operating state of a technical system is generally described by a particular point in a multidimensional state space, wherein this point is assumed on the basis of properties of the technical system and possibly external influences and other parameters. An operating point is in this case assigned the values of a plurality of variables, wherein these variables are referred to below as first and second state variables. For one or more of these state variables, which are referred to below as second state variables, there are corresponding threshold value criteria depending on the operating range of the technical system and that are used to indicate whether faulty behavior of the technical system is present under some circumstances.

There is a need to view the values of the above-described first and second state variables in an easy and compact manner, such that a user is intuitively able to recognize faulty behavior of the technical system.

Conventional solutions for viewing operating states of a technical system use a traffic light-like color scheme in order to characterize the states, for example, wherein a green color represents a normal state, a yellow color represents a critical state and a red color represents an unpermitted or highly critical state. The corresponding color scheme is used inter alia in process charts, alarm lists with timestamps, process chain steps and the like.

The known solutions generally entail complex viewing, meaning that critical states and information linked thereto are often not able to be recognized quickly by the user.

SUMMARY

An aspect relates to a method for the computer-aided processing of operating data of a technical system that provides easily perceptible and meaningful viewing of critical states of the technical system.

The method according to embodiments of the invention is used for the computer-aided processing of operating data of a technical system, wherein the operating data have been recorded during operation of the technical system in a predefined operating interval and are stored in a memory in the form of digital data.

In the method according to embodiments of the invention, a respective state vector is extracted from the operating data for a multiplicity of operating times within the predefined operating interval, which state vector comprises a pair of first state variables containing associated state values of the technical system at the respective operating time and at least one second state variable from a number of second state variables containing associated state values of the technical system at the respective operating time. The second state variables are variables of the technical system, such as for example suitable sensor values or characteristic variables that are present at a corresponding operating time and by way of which it is possible to recognize whether the state of the technical system is normal or is in a critical range. By contrast, the first state variables characterize the state of the technical system at the corresponding operating time without it necessarily being able to be derived from these variables whether the technical system is in a critical state. Corresponding examples of operating data and first and second state variables are specified further below.

According to embodiments of the invention, a two-dimensional display is generated on a display of a user interface, wherein the display corresponds to the two-dimensional space of the state values of the pairs of first state variables of the state vectors in a Cartesian coordinate system. In other words, the state space is described by a plane that is spanned by two axes that are perpendicular to one another, wherein one axis represents the state values of a first state variable and the other axis represents the state values of the other first state variable. The axes do not in this case necessarily have to be part of the two-dimensional display. One axis of the Cartesian coordinate system runs in the horizontal direction in the two-dimensional display, and the other axis runs in the vertical direction.

The two-dimensional display depicts a multiplicity of adjacent state ranges, wherein all of the state vectors containing state values of pairs of first state variables within a respective state range are assigned to this state range, and a threshold value criterion comprising at least one threshold value is defined for the state values of each second state variable of the state vectors assigned to the respective state range. There is therefore at least one threshold value specific to the respective second state variable and to the respective state range. The threshold value criterion is defined by virtue of suitably defining a criterion of exceeding or falling below the at least one threshold value. When the threshold value criterion is met, the corresponding state value of the respective second state variable of the state vector is classed as normal for the operation of the technical system. Expressed the other way round, a corresponding state value that does not meet the threshold value criterion is considered to be critical for the operation of the technical system.

In the context of the method according to embodiments of the invention, a bar chart is furthermore depicted in a respective state range, in which bar chart a first bar and a second bar of the bar chart belong to each second state variable. A bar may in this case possibly also have a length of zero, which may be recognized in the corresponding bar chart by way of an empty placeholder. The length of the first bar represents the number of first state vectors or an occurrence time period, derived from the operating times of the first state vectors, for the number of first state vectors. In this case, the first state vectors are all state vectors that are assigned to the respective state range and contain the respective second state variable. As an alternative, the first state vectors are all state vectors that are assigned to the respective state range and contain the respective second state variable and for which the state value of the respective second state variable also meets the threshold value criterion.

The occurrence time period defined above for the number of first state vectors may for example be determined when a corresponding operating time always also displays the change of at least one state value of the state vector. In this case, the time period in which a state vector containing corresponding state values was present is given by the time period between consecutive operating times. In the same way, the occurrence time period mentioned further below may also be determined for the number of second state vectors.

In the two-dimensional display, the length of the second bar for the respective second state variable and the respective state range furthermore represents the number of second state vectors or an occurrence time period, derived from the operating times of the second state vectors, for the number of second state vectors, wherein the second state vectors are all state vectors that are assigned to the respective state range and contain the respective second state variable and for which the state value of the second state variable also does not meet the threshold value criterion.

The method according to embodiments of the invention achieves a meaningful display in the form of bar charts, wherein each bar chart is assigned intuitively to a state range in the space of the state values of the first state variables through appropriate positioning. The bar charts easily convey the total number of states that have occurred in the corresponding state range and the information as to whether critical states were assumed.

In one embodiment, the respective state ranges contained in the two-dimensional display are adjoining rectangles. In spite of this, the state ranges may possibly also have another form. In particular, the state ranges correlate with predefined operating ranges of the technical system, such as for example startup, constant operation and shutdown of a machine.

In a further refinement of the method according to embodiments of the invention, the first bar or bars in each bar chart are offset with respect to an axis of the Cartesian coordinate system, and in particular with respect to a vertical axis, in comparison with the second bar or bars. In a further refinement, all of the first and second bars extend parallel to the same axis of the Cartesian coordinate system in their longitudinal direction, wherein the axis is the vertical axis. In both embodiments just described, a bar display that is easily formed and readily comprehensible is achieved.

In a further embodiment, a respective threshold value criterion comprises a lower threshold value and an upper threshold value for state values of a respective second state variable in the respective state range, wherein the threshold value criterion is met when the state value of the respective second state variable is between the lower and upper threshold value.

In one refinement of the above embodiment, a respective second bar of at least some and in particular all of the second bars is arranged on a base line in the two-dimensional display, wherein the base line may possibly be selected to be different for each bar. In this case, the bar section on one side of the base line represents second state vectors containing state values of the respective second state variable below the lower threshold value, whereas the bar section on the other side of the base line represents second state vectors containing state values of the respective second state variable above the upper threshold value. This embodiment easily and intuitively displays the exceedance and falling below of corresponding threshold values in the respective state range.

The base lines run parallel to an axis of the Cartesian coordinate system and in particular to a horizontal axis. In this case, the longitudinal direction of the second bar extends from the base line in the direction of the other axis of the Cartesian coordinate system. The bar sections have different colors on the different sides of the base line, such that they are able to be distinguished easily.

In a further embodiment, the same base line is used for all of the second bars within a bar chart in the two-dimensional display, as a result of which a compact display of the bar chart is made possible.

In a further refinement, the base lines are arranged at the same position with respect to the other axis of the Cartesian coordinate system in all of the bar charts that are next to one another along an axis of the Cartesian coordinate system in the two-dimensional display.

In a further refinement, the first bars extend in their longitudinal direction along the other axis of the Cartesian coordinate system in all of the bar charts that are next to one another along an axis of the Cartesian coordinate system in the two-dimensional display, and they start at the same position with respect to the other axis. As a result, a particularly clear display of the first bars in the bar charts is achieved.

In a further, embodiment, the extent of the deviation of the state values of the second state vectors in the corresponding state range from the threshold value criterion is represented by the filling of a respective second bar of at least some and in particular all of the second bars in the two-dimensional display. The extent of the deviation is in particular in this case represented by the color saturation or the brightness or the color of the filling. In this embodiment, the filling of the bars is thus used to code further information with regard to the extent of the deviation.

In one variant, in which the threshold value criterion comprises an upper and a lower threshold value, the extent of the deviation for second state vectors containing state values of the respective second state variable below the lower threshold value corresponds to the sum of the absolute differences between these state values and the lower threshold value, or the extent depends on this sum. As an alternative or in addition, the extent of the deviation for second state vectors containing state values of the respective second state variable above the upper threshold value corresponds to the sum of the absolute differences between these state values and the upper threshold value, or the extent depends on this sum. This embodiment provides a simple calculation method for the extent.

In one embodiment of the method according to embodiments of the invention, the user interface allows a user to input a command, wherein the command input triggers the depiction of a detailed view on the display of the user interface for state values of a second state variable for one or more state ranges. The command input may be brought about for example by a cursor, operated using a computer mouse, on the display, wherein the cursor position and an interaction on the mouse may be used to mark corresponding state ranges for which the user would like detailed information. If the corresponding state ranges contain a plurality of second state variables, either a plurality of detailed views are generated for the respective state variables or the user may specify the second state variable for which he would like a detailed view beforehand.

In one embodiment, the detailed view comprises a two-dimensional chart with a time axis and an axis perpendicular thereto and representing the state values of the respective second state variables, wherein the two-dimensional chart depicts the state values of the respective second state variables of the state vectors that are assigned to the one or more state ranges as data points as a function of the operating times of the occurrence of the state values in the predefined operating interval. A user thereby obtains extensive information about the temporal evolution of the values of second state variables. The two-dimensional chart may possibly also depict the at least one threshold value, in particular the lower and upper threshold value defined above, of the threshold value criterion in the form of a line or lines.

In one further variant, data points that are adjacent along the time axis are at least partly connected to one another via lines, as a result of which the temporal evolution of the data points becomes very readily discernible. Furthermore, in a further refinement, the data points for different state ranges are displayed differently in the two-dimensional chart, such that the state ranges are able to be distinguished.

In a further variant of the method according to embodiments of the invention, the user interface allows a user to input a command by way of which the threshold value criterion is adjusted. A user may in this case in particular redefine the appropriate threshold values of the threshold value criterion.

In one embodiment, the method according to embodiments of the invention is performed during operation of the technical system. In this case, the predefined operating interval represents a predefined time period from the current time into the past. In this case, the corresponding two-dimensional display or the detailed view derived therefrom may be updated at regular time intervals.

When the method according to embodiments of the invention is used during operation of the technical system, the user interface, in one variant, allows a user to input a command that brings about a change to one or more manipulated variables in the technical system during operation.

The method according to embodiments of the invention may be used for any technical systems. The technical system may in particular comprise an electric motor, for example for a coal mill in a power plant or for crushing rocks in a quarry or for a conveyor belt and/or a gas turbine, in particular for generating electrical energy, and/or a contactor.

The operating data or the first and second state variables may furthermore be very different variables. The operating data and/or the first state variables and/or the number of second state variables comprise one or more of the following variables:

- a (supplied and output) electric power of a component of the technical system, such as for example an electric motor or a gas turbine, wherein here and below a component may also denote the entire technical system;
- a rate of rotation of a component of the technical system, such as for example an electric motor or a gas turbine;
- a torque of a component of the technical system, such as for example an electric motor or a gas turbine;
- a temperature at a point in the technical system;
- an electric current in a component of the technical system;
- a voltage in a component of the technical system;
- a wear index of a component of the technical system;
- number of switching procedures per time interval of a component of the technical system, such as for example a contactor.

In addition to the method described above, embodiments of the invention relates to a device for the computer-aided processing of operating data of a technical system, wherein the operating data have been recorded during operation of the technical system in a predefined operating interval and are stored in a memory in the form of digital data. The device is in this case designed such that the device is able to perform the method according to embodiments of the invention or one or more variants of the method according to embodiments of the invention. In other words, the device contains a user interface with a display and a corresponding computer means or computer that generates the above-described view on the display of the user interface.

Embodiments of the invention furthermore comprises a computer program product (non-transitory computer readable storage medium having instructions, which when executed by a processor, perform actions) containing program code stored on a machine-readable medium for performing the method according to embodiments of the invention or one or more variants of the method according to embodiments of the invention when the program code is executed on a computer. Embodiments of the invention furthermore relates to a computer program containing a program code for performing the method according to embodiments of the invention or one or more variants of the method according to embodiments of the invention when the program code is executed on a computer.

BRIEF DESCRIPTION

Some of the embodiments will be described in detail, with reference to the following figures, wherein like designations denote like members, wherein.

DETAILED DESCRIPTION

Figure 1:
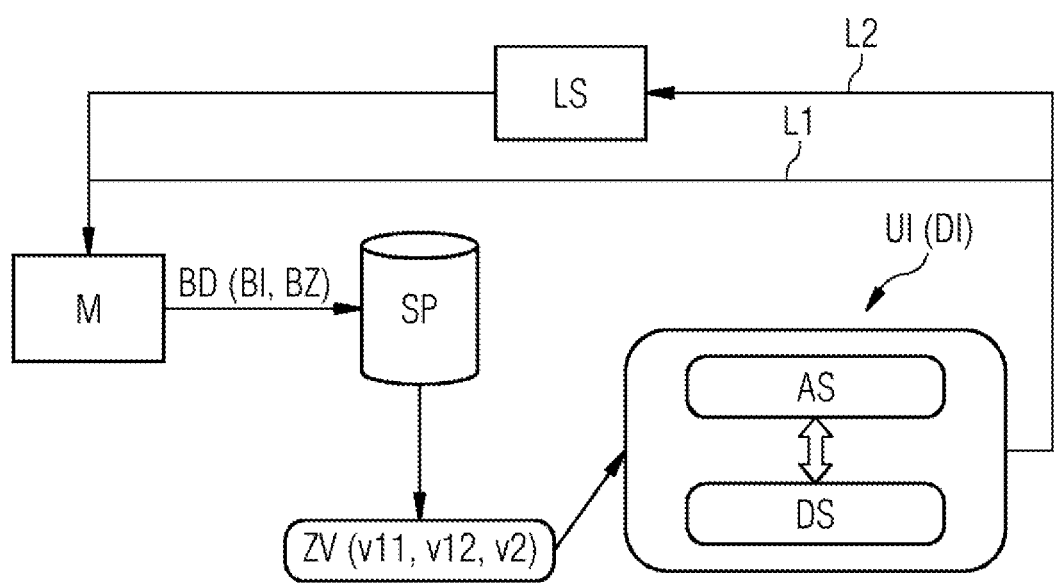
FIG. 1 shows a schematic flowchart that explains the performance of one variant of the method according to embodiments of the invention.

FIG. 1 schematically illustrates the sequence of one variant of the method according to embodiments of the invention. This variant is performed online during operation of a technical system in the form of a machine M, such as for example an electric motor.

In the course of the operation of the machine M, operating data BD are recorded at predefined operating times BZ within an operating interval BI. The operating interval is in this case a predefined time period starting from the current time into the past. The operating data are stored in the form of digital data in a suitable memory SP and the method according to embodiments of the invention is performed on the basis of these operating data. The method may in this case possibly also be performed offline for previous operation of the machine, provided that corresponding operating data were stored in the memory SP for the previous operation. The operating data may comprise any variables that occur during operation of the machine and that were recorded suitably for example by way of sensors or were derived from sensor data.

In the method of FIG. 1, state vectors ZV for the respective operating times BZ are first of all extracted from the operating data BD in a computer-aided manner. A state vector contains two state values for a pair of first state variables v11 and v12, and a state value v2 for a second state variable. The state values of the first state variables and the second state variable may in this case be data values from the operating data, but they may also be calculated at least in part from data values of the operating data. By way of example, a first state variable may correspond to the rate of rotation of an electric motor and the other first state variable may correspond to the power supplied to the electric motor. By contrast, the second state variable may for example represent a temperature that is recorded within the electric motor. The operating data or the state variables may also concern any other variables, wherein corresponding examples of such variables have already been given above.

In a next step, a two-dimensional display in the form of an aggregated view AS is generated on a suitable display DI of a user interface UI in a computer-aided manner. This view constitutes a key element of embodiments of the invention and easily conveys the correlation between the pair of first state variables and the second state variable, as well as a deviation of the second state variable from a normal range, to a user. By way of a suitable interaction on the user interface UI, the user is furthermore able to generate suitable detailed views DS from the aggregated view AS, as will be explained in even more detail below.

The user is able to draw appropriate conclusions from the information conveyed via the aggregated view AS and the detailed views DS. In one variant, the user is able to enter control commands on the machine M directly via the user interface U1, as indicated by the line L1. The user may likewise forward his findings to another location, such as for example to a control system LS, as indicated by the line L2. The control system may then intervene in the operation of the machine M in a suitable manner.

Figure 2:
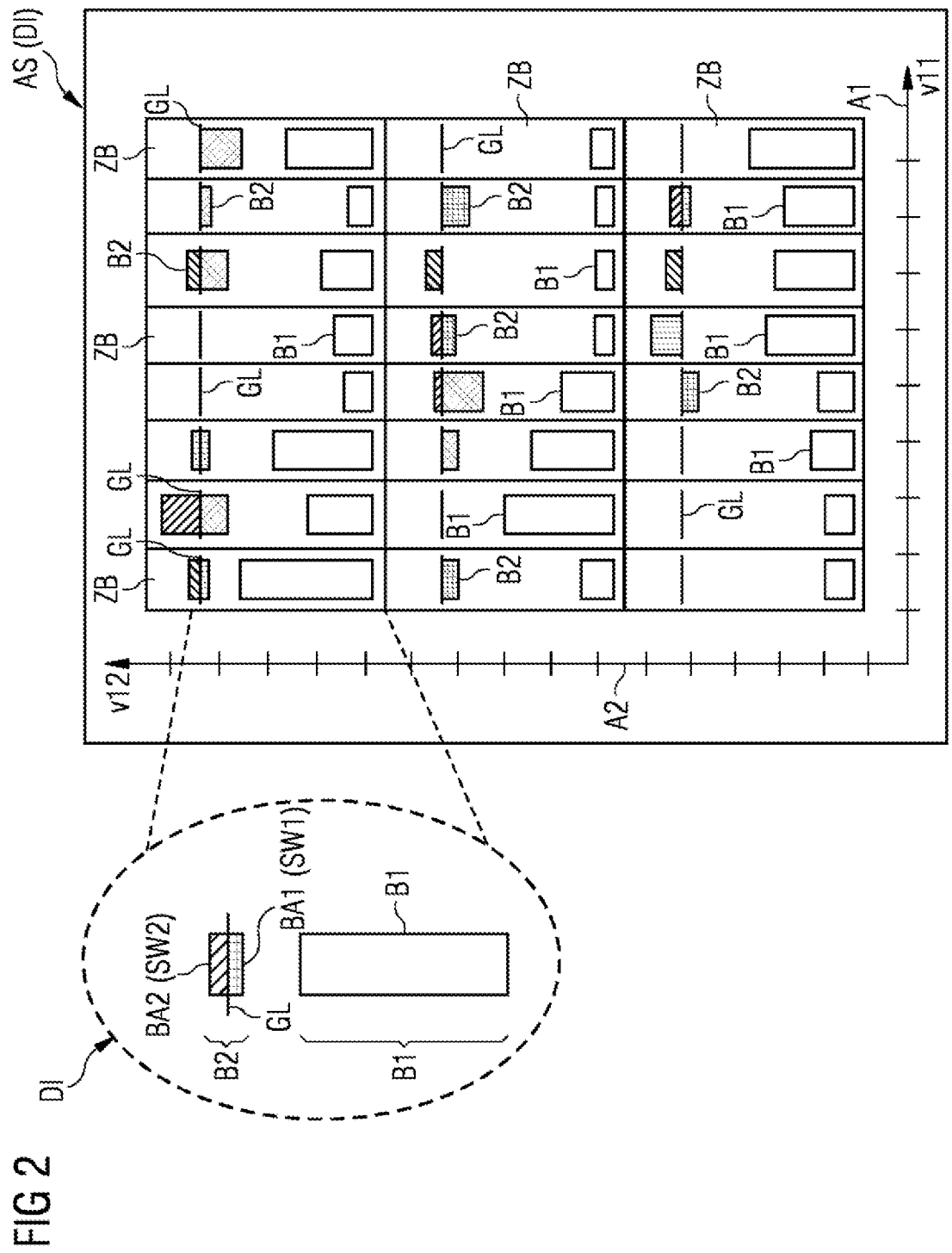
FIG. 2 shows a depiction of a two-dimensional display as it appears on the display of a user interface in one embodiment of the invention.

FIG. 2 shows, by way of example, an aggregated view AS that is generated on a corresponding display DI based on the method of FIG. 1. The surface of the display in this case corresponds to the plane of the drawing of FIG. 2. The reference signs depicted in the aggregated view serve to facilitate the description of this view and are not part of the view (apart from reference signs v11 and v12). The aggregated view AS of FIG. 2 constitutes the space of the data points that are represented by the state values of the two first state variables v11 and v12. This space is represented by a Cartesian coordinate system with the horizontal axis A1 and the vertical axis A2. The scale of the axis A1 in this case depicts values of the first state variable v11. In the same way, the scale of the axis A2 depicts state values of the first state variable v12. In this case, the reference signs v11 and v12 do not have to be used to denote the state variables, but rather a corresponding state variable may instead be specified in text form, for example using the text "rate of rotation" or "power". The axes A1 and A2 and the reference of the state variables in the aggregated view AS may possibly also be omitted.

The aggregated view AS contains a multiplicity of state ranges ZB, only some of which are denoted by this reference sign for the sake of clarity. The state ranges in this case constitute adjoining elongate rectangles, wherein the aggregated view comprises a total of three rows of such rectangles, each containing eight rectangles. That is to say, the aggregated view AS contains a total of 24 rectangles or state ranges ZB. Each rectangle represents a section of the space of the data points of the pairs of first state variables. A suitable division into these state ranges is generally defined by an expert in the field. In this case, each state range corresponds to an operating regime of the technical system. The state ranges ZB do not necessarily have to be designed to be rectangular, rather they may also have another shape depending on the operating regime.

In the respective state ranges ZB, a first bar B1 and a second bar B2 are in each case depicted in the aggregated view AS. The first bars B1 are illustrated in white in FIG. 2, but generally have a predefined color, for example gray. All of the bars B1 in this case have the same color. For the sake of clarity, only some of these bars are provided with the reference sign B1. Furthermore, a base line GL is arranged in each state range ZB above the bar B1, on which base line a second bar B2 is positioned. Although no second bars are able to be seen explicitly in some state ranges ZB, this is understood in the context of embodiments of the invention to mean that a second bar with a height of zero is present, this being conveyed by the depiction of the base line GL on its own. Likewise, a first bar B1 with a height of zero may possibly occur in a corresponding state range ZB. A first bar with a height of zero is in this case depicted by virtue of the corresponding region in which a first bar with a height not equal to zero is otherwise located being empty.

The respective second bars B2 consist of a bar region BA1 situated below the base line GL and with which a lower threshold value SW1 is associated, and a bar region BA2 situated above the base line GL and with which an upper threshold value SW2 is associated. This is apparent from the detailed illustration DE of FIG. 2, which depicts the first and second bars of the upper left state range ZB in magnified form. The bar regions BA1 and BA2 have a color different from the bars B1. In this case, all of the bar regions BA1 have uniform coloring. All of the bar regions BA2 furthermore also have uniform coloring, which is however different from the coloring of the bar regions BA1. As a result of the different pattern fillings of the bar regions of the bars B2, FIG. 2 indicates that the color saturation of the bar regions may be different, wherein the color saturation codes information, as will be explained in even more detail further below.

Aggregated information about the state vectors or data points within the respective state range ZB is conveyed by way of the bars B1 and the bars B2. The length of a respective bar B1 in this case indicates how many data points, that is to say pairs of state values of the first state variables v11 and v12, are present within the corresponding state range. By contrast, the length of the bar region BA1 of the bar B2 indicates how many state vectors in the corresponding state range ZB contain state values of the second state variable v2 that lie below the lower threshold value SW1. In the same way, the length of the bar section BA2 indicates how many state vectors in the corresponding state range ZB contain state values of the second state variable v2 that lie above the upper threshold value SW2. In other words, the length of the bar section BA1 indicates the number of state vectors with coordinates v11 and v12 in the corresponding state range ZB and a coordinate v2 that falls below the threshold value SW1. In the same way, the bar region BA2 indicates the number of state vectors with coordinates v11 and v12 in the region ZB and a coordinate v2 that exceeds the threshold value SW2.

As already mentioned above, the color saturation of the color sections BA1 and BA2 codes further information. This information indicates the extent to which the state values of the second state variable deviate from the corresponding lower or upper threshold. In other words, the color saturation of a lower bar section BA1 indicates the extent to which the state values, correlated with this bar section, of the second state variable deviate from the lower threshold value, and the color saturation of an upper bar section BA2 indicates the extent to which the state values, correlated with this bar section, of the second state variable deviate from the upper threshold value. The extent of the deviation may be represented for example by the total sum of the absolute differences between the state values and the corresponding threshold values. In one variant, a strong color saturation in this case represents a greater deviation of the state values from the upper or lower threshold value.

Using the bar display just described, a user is easily conveyed aggregated information about the state vectors in the corresponding state range ZB, and thus in the corresponding operating regime. The user is in this case also always able to recognize the operating regime through the depiction of the two-dimensional state space of the state variables v11 and v12. At the same time, the user intuitively obtains the information as to whether corresponding threshold values have been fallen below or exceeded. The threshold values are in this case defined such that outliers below or above the threshold values correspond to operation that does not correspond to normal operation of the technical system and should therefore be classed as critical. The operating regimes in which critical states occur are accordingly easily conveyed to a user. Furthermore, the aggregated view also uses color saturation to intuitively convey the information as to whether the deviations of the state values in the respective state range that have occurred are very large.

Figure 3:
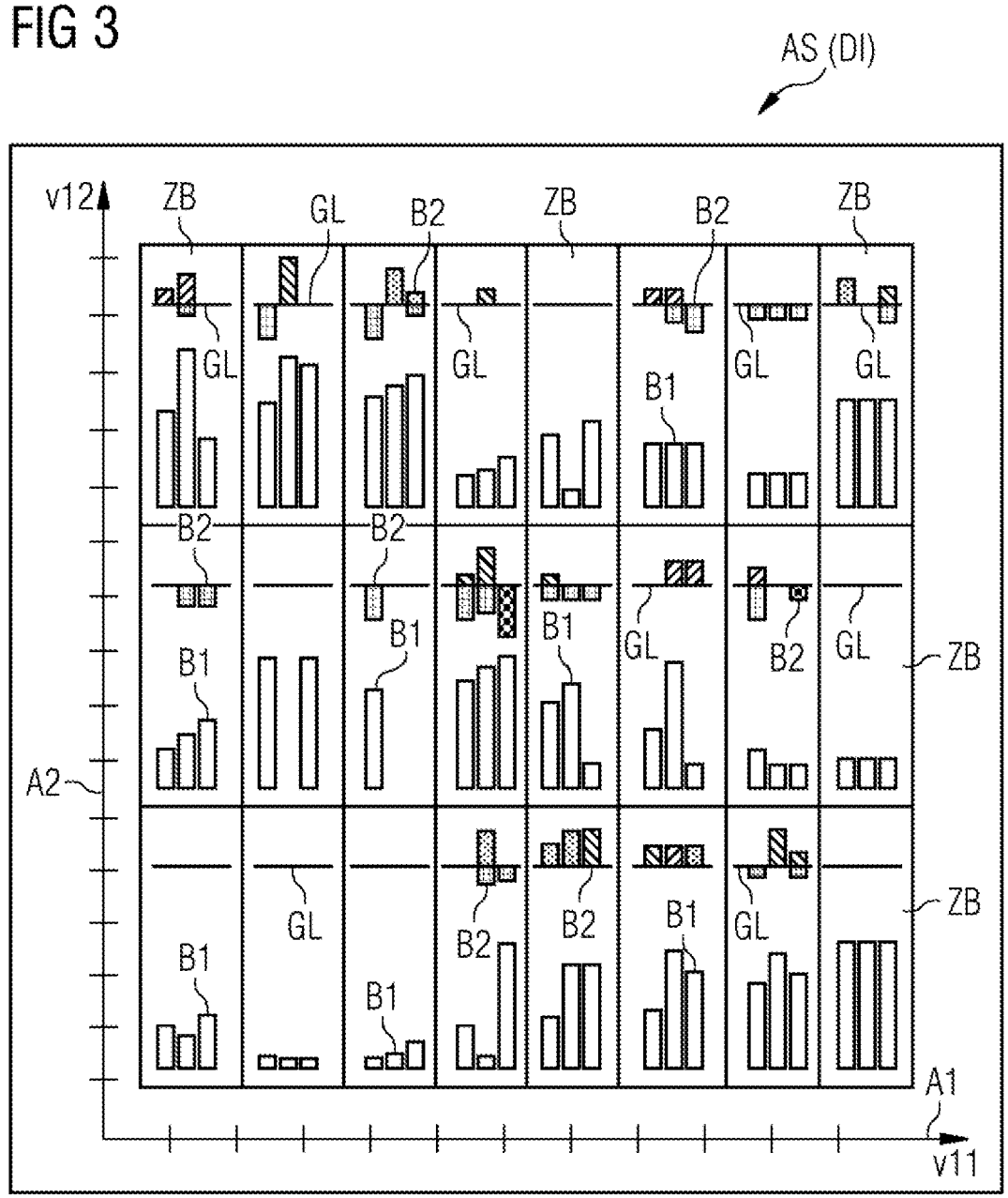
FIG. 3 shows a depiction of a two-dimensional display as it appears on the display of a user interface in another embodiment of the invention.

FIG. 3 shows an alternative variant for generating an aggregated view AS based on the method according to embodiments of the invention. In this alternative variant, in addition to the state values of the first state variables v11 and v12, state values of a plurality of second state variables are now extracted from the operating data BD of the machine M. In the case of FIG. 3, in this case three second state variables are considered per state range ZB. In other words, the aggregated view of FIG. 3 differs from FIG. 2 in that no longer one pair consisting of a first and a second bar but rather three pairs consisting of a first and second bar are present per state range ZB. The bars of a respective pair in this case belong to another second state variable.

The length of a bar B1 in FIG. 3 indicates the number of all of the state vectors for the range ZB that contain a state value for the corresponding second state variable. It should be borne in mind here that a data point or state vector does not necessarily always have to be assigned state values for all three second state variables. In particular, only state values for one or two second state variables may also exist for some data points, provided that state values were not determined for all of the second state variables at the corresponding operating time (for example due to lack of measurements).

Similarly to FIG. 2, the length of a second bar B2 in a respective state range ZB of FIG. 3 for the corresponding second state variable indicates the number of state vectors for which the state value of the second state variable fell below a lower threshold value (lower bar region BA1) or exceeded an upper threshold value (upper bar region BA2). For the rest, the illustration of FIG. 3 corresponds to the illustration of FIG. 2, that is to say the space of the data points according to the pairs of state variables v11 and v12 is again depicted in the Cartesian coordinate system of the axes A1 and A2, wherein corresponding state ranges ZB are illustrated by rectangles. Likewise, the bars B1 have a uniform color that differs from the colors of the bar sections BA1 and BA2. The different color saturation of the bar sections again indicates the extent of the deviation of the state values of the corresponding second state variable from the lower threshold value SW1 or from the upper threshold value SW2.

In the embodiments described here, a user is able to select one or more state ranges ZB from the aggregated view AS through a suitable interaction on the user interface UI and generate corresponding detailed views DS for this purpose. This selection may be made for example using a cursor, operated by a computer mouse, on the aggregated view AS, by way of which specific state ranges ZB are able to be marked.

Figure 4:
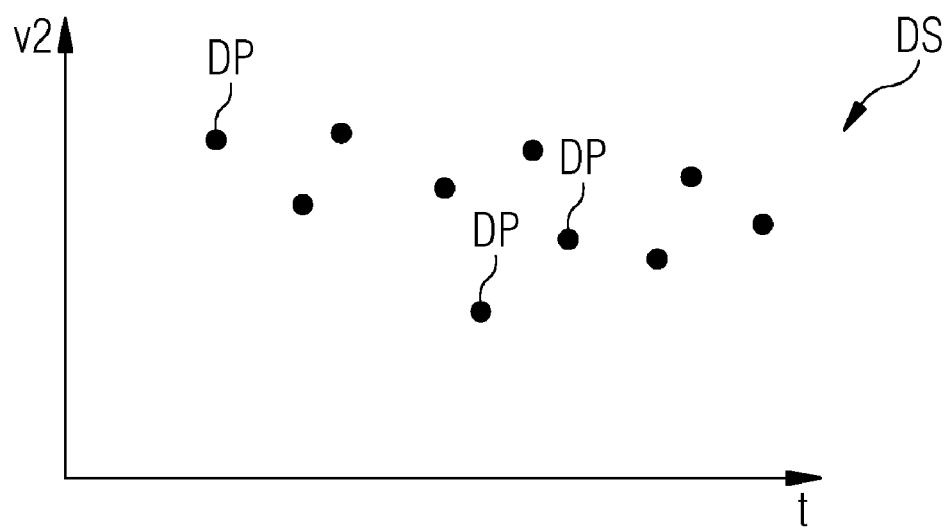
FIG. 4 shows a first detailed views that a user is able to generate for state ranges from the display of FIG. 2.
Figure 5:
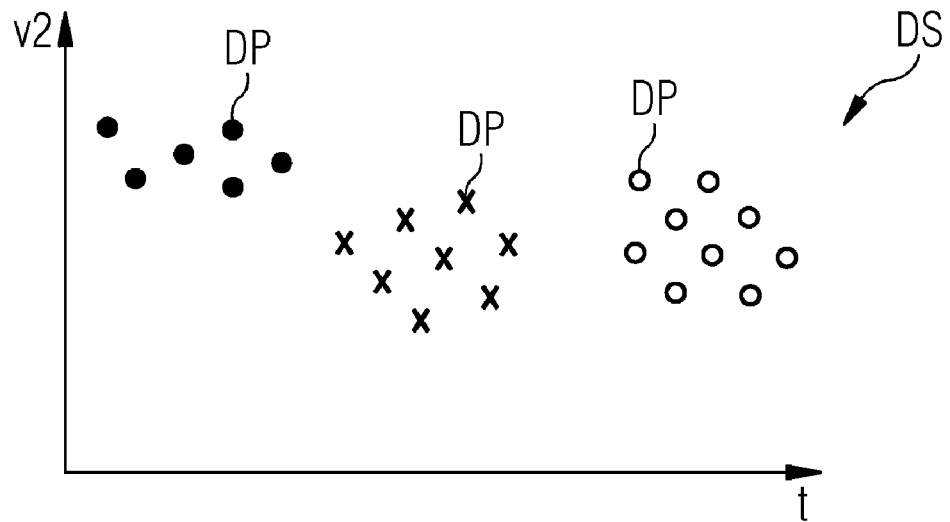
FIG. 5 shows a second detailed views that a user is able to generate for state ranges from the display of FIG. 2

FIG. 4 and FIG. 5 show examples of detailed views DS that result from marking corresponding state ranges in the aggregated view AS of FIG. 2. The illustrations of FIG. 4 and FIG. 5 are intended in this case only to clarify the principle of the detailed depiction. A real detailed view generally contains a far greater number of the data points DP that are described below. The real detailed view furthermore does not contain the reference signs DP.

In the detailed views DS, the time t within the operating interval BI under consideration is depicted along the abscissa. By contrast, the ordinate v2 indicates state values of the second state variable. FIG. 4 shows the case in which only one state range ZB has been selected from the aggregated view AS. The temporal evolution of the state values of the second state variable is displayed via data points DP that are illustrated as black dots. For the sake of clarity, only some of the data points are provided with the reference sign DP. A respective data point DP indicates, through its value along the abscissa, the operating time at which the corresponding state value of the second state variable occurred, whereas its value along the ordinate indicates the corresponding state value of the second state variable. The abscissa and the ordinate in this case contain a corresponding scale, which is not depicted for the sake of clarity.

FIG. 5 shows a detailed view DS similar to FIG. 4, wherein a plurality of state ranges ZB, specifically a total of three state ranges, have now been selected in the aggregated view AS by the user. For the respective state ranges, the corresponding state values of the second state variable are again identified by data points DP, only some of which are provided with this reference sign. In this case, there are three different types of data points. On the one hand, there are data points that consist of black dots, similarly to FIG. 4. On the other hand, there are data points that are represented by crosses and data points that are white dots.

The different types of data points correspond to different state ranges that have been selected by the user. The state range to which the corresponding data points belong is thereby conveyed to the user. In the exemplary scenario of FIG. 5, different state ranges also correspond to different operating times of the machine, since the different data points lie along different sections of the time axis t. Data points of different types may also be generated in a manner different from that in FIG. 5. In particular, data points belonging to different state ranges may be displayed by different colors.

In the detailed views of FIG. 4 and FIG. 5, the corresponding lower and upper threshold value may additionally also be displayed for the respective state variable in the corresponding state range. This is achieved in particular by depicting a horizontally running line at the level of the upper or lower threshold value. There is possibly also the option of a user being able to adjust the threshold values in the respective detailed views by displacing the respective horizontal line in an appropriate manner. Adjusting corresponding threshold values results in the bar display in the aggregated view AS also being adjusted accordingly.

If a plurality of state ranges are displayed in a detailed view, then the threshold values in the different state ranges are generally different. This may be achieved by lines that are depicted differently or by lines at different positions in the corresponding detailed view.

The above-described embodiments of the invention have a number of advantages. An efficient display of machine information in the form of bar charts in a state space of a pair of state variables is in particular achieved. In this case, information about both state values of first state variables and state values of second state variables is depicted, without having to switch between a plurality of views. Furthermore, more information is depicted on less space, which allows more accurate reading for the user. This makes it easier to optimize the use of the machine. Furthermore, by changing to a detailed view, it is made possible for a user to analyze parameters of the corresponding state range more accurately.

In contrast to conventional displays (for example heat maps), a number of data points are depicted on a bar length. A user is in this case able to perceive length differences far more accurately than color tone differences or brightness differences. This leads to more accurate reading of the information. Aligning the first and second bars with one another allows a more accurate comparison between different state ranges. Furthermore, the extent or the significance of outliers below or above threshold values is indicated by the color saturation of the corresponding bars.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for computer-aided processing of operating data of a technical system, wherein the operating data have been recorded during operation of the technical system in a predefined operating interval and are stored in a memory in the form of digital data, comprising:

extracting a respective state vector from the operating data for a multiplicity of operating times within the predefined operating interval, which state vector comprises a pair of first state variables containing associated state values of the technical system at the respective operating time and at least one second state variable from a number of second state variables containing associated state values of the technical system at the respective operating time;

generating a two-dimensional display on a display of a user interface, wherein the display corresponds to the two-dimensional space of the state values of the pairs of first state variables of the state vectors in a Cartesian coordinate system and the display depicts a multiplicity of adjacent state ranges, wherein all of the state vectors containing state values of pairs of first state variables within a respective state range are assigned to this state range, and a threshold value criterion comprising at least one threshold value is defined for the state values of each second state variable of the state vectors assigned to the respective state range, wherein, when the threshold value criterion is met, the corresponding state value of the respective second state variable of the state vector is classed as normal for the operation of the technical system;

depicting a bar chart in a respective state range, in which bar chart a first bar and a second bar of the bar chart belong to each second state variable, wherein the length of the first bar represents the number of first state vectors or an occurrence time period, derived from the operating times of the first state vectors, for the number of first state vectors, wherein the first state vectors are all state vectors that are assigned to the respective state range and contain the respective second state variable or are all state vectors that are assigned to the respective state range and contain the respective second state variable and for which the state value of the respective second state variable also meets the threshold value criterion;

the length of the second bar represents the number of second state vectors or an occurrence time period, derived from the operating times of the second state vectors, for the number of second state vectors, wherein the second state vectors are all state vectors that are assigned to the respective state range and contain the respective second state variable and for which the state value of the second state variable also does not meet the threshold value criterion.

2. The method as claimed in claim 1, wherein the respective state ranges are adjoining rectangles.

3. The method as claimed in claim 1, wherein the first bar or bars in each bar chart are offset with respect to an axis of the Cartesian coordinate system in comparison with the second bar or bars.

4. The method as claimed in claim 1, wherein all of the first and second bars extend parallel to the same axis of the Cartesian coordinate system in their longitudinal direction.

5. The method as claimed in claim 1, wherein a respective threshold value criterion comprises a lower threshold value and an upper threshold value for state values of a respective second state variable in the respective state range, wherein the threshold value criterion is met when the state value of the respective second state variable is between the lower and upper threshold value.

6. The method as claimed in claim 5, wherein a respective second bar of at least some of the second bars is arranged on a base line in the two-dimensional display, wherein the bar section on one side of the base line represents second state vectors containing state values of the respective second state variable below the lower threshold value and the bar section on the other side of the base line represents second state vectors containing state values of the respective second state variable above the upper threshold value.

7. The method as claimed in claim 6, wherein the bar sections on the different sides of the base line have different colors.

8. The method as claimed in claim 6, wherein the same base line is used for all of the second bars within a bar chart in the two-dimensional display.

9. The method as claimed in claim 6, wherein the base lines are arranged at the same position with respect to the other axis of the Cartesian coordinate system in all of the bar charts that are next to one another along an axis of the Cartesian coordinate system in the two-dimensional display.

10. The method as claimed in claim 1, wherein the first bars extend in their longitudinal direction along the other axis of the Cartesian coordinate system in all of the bar charts that are next to one another along an axis of the Cartesian coordinate system in the two-dimensional display, and start at the same position with respect to the other axis.

11. The method as claimed in claim 1, wherein the extent of the deviation of the state values of the second state vectors in the corresponding state range from the threshold value criterion is represented by the filling of a respective second bar of at least some of the second bars in the two-dimensional display.

12. The method as claimed in claim 11, wherein the extent of the deviation is represented by the color saturation or the brightness or the color of the filling.

13. The method as claimed in claim 11, wherein the extent of the deviation for second state vectors containing state values of the respective second state variable below the lower threshold value corresponds to the sum of the absolute differences between these state values and the lower threshold value or depends on this sum, and/or wherein the extent of the deviation for second state vectors containing state values of the respective second state variable above the upper threshold value corresponds to the sum of the absolute differences between these state values and the upper threshold value or depends on this sum.

14. The method as claimed in claim 1, wherein the user interface allows a user to input a command that triggers the depiction, in each case for one or more second state variables, of a detailed view on the display for state values of the respective second state variable for one or more state ranges.

15. The method as claimed in claim 14, wherein the detailed view comprises a two-dimensional chart with a time axis and an axis perpendicular thereto and representing the state values of the respective second state variable, wherein the two-dimensional chart depicts the state values of the respective second state variable of the state vectors that are assigned to the one or more state ranges as data points as a function of the operating times of the occurrence of the state values in the predefined operating interval.

16. The method as claimed in claim 15, wherein data points that are adjacent along the time axis are at least partly connected to one another via lines.

17. The method as claimed in claim 15, wherein the data points for different state ranges are displayed differently in the two-dimensional chart.

18. The method as claimed in claim 1, wherein the user interface allows a user to input a command by way of which the threshold value criterion is adjusted.

19. The method as claimed in claim 1, wherein the method is performed during operation of the technical system.

20. The method as claimed in claim 19, wherein the user interface allows a user to input a command that brings about a change to one or more manipulated variables in the technical system during operation.

21. The method as claimed in claim 1, wherein the technical system comprises an electric motor and/or a gas turbine and/or a contactor.

22. The method as claimed in claim 1, wherein the operating data and/or the first state variables and/or the number of second state variables comprise one or more of the following variables:
an electric power of a component of the technical system;
a rate of rotation of a component of the technical system;
a torque of a component of the technical system;
a temperature at a point in the technical system;
an electric current in a component of the technical system;
a voltage in a component of the technical system;
a wear index of a component of the technical system;
a number of switching procedures per time interval of a component of the technical system.

23. A device for computer-aided processing of operating data of a technical system, wherein the operating data have been recorded during operation of the technical system in a predefined operating interval and are stored in a memory in the form of digital data, wherein the device is configured so as to perform a method comprising:
extracting a respective state vector from the operating data for a multiplicity of operating times within the predefined operating interval, which state vector comprises a pair of first state variables containing associated state values of the technical system at the respective operating time and at least one second state variable from a number of second state variables containing associated state values of the technical system at the respective operating time;
generating a two-dimensional display on a display of a user interface, wherein the display corresponds to the two-dimensional space of the state values of the pairs of first state variables of the state vectors in a Cartesian coordinate system and the display depicts a multiplicity of adjacent state ranges, wherein all of the state vectors containing state values of pairs of first state variables within a respective state range are assigned to this state range, and a threshold value criterion comprising at least one threshold value is defined for the state values of each second state variable of the state vectors assigned to the respective state range, wherein, when the threshold value criterion is met, the corresponding state value of the respective second state variable of the state vector is classed as normal for the operation of the technical system;
depicting a bar chart in a respective state range, in which bar chart a first bar and a second bar of the bar chart belong to each second state variable, wherein
the length of the first bar represents the number of first state vectors or an occurrence time period, derived from the operating times of the first state vectors, for the number of first state vectors, wherein the first state vectors are all state vectors that are assigned to the respective state range and contain the respective second state variable or are all state vectors that are assigned to the respective state range and contain the respective second state variable and for which the state value of the respective second state variable also meets the threshold value criterion;
the length of the second bar represents the number of second state vectors or an occurrence time period, derived from the operating times of the second state vectors, for the number of second state vectors, wherein the second state vectors are all state vectors that are assigned to the respective state range and contain the respective second state variable and for which the state value of the second state variable also does not meet the threshold value criterion.

24. A computer program product, comprising a computer readable hardware storage device having computer readable program code stored therein, said program code executable by a processor of a computer system to implement the method as claimed in claim 1, when the program code is executed on a computer.

* * * * *